United States Patent [19]

Caplan et al.

[11] Patent Number: 5,627,690
[45] Date of Patent: *May 6, 1997

[54] LIGHT-WEIGHT THREE-ELEMENT CLINICAL VIEWER

[75] Inventors: Charles H. Caplan, Middleton, Wis.; Richard A. Buchroeder, Tucson, Ariz.

[73] Assignee: Surgical Acuity, Inc., Madison, Wis.

[*] Notice: The term of this patent shall not extend beyond the expiration date of Pat. No. 5,463,500.

[21] Appl. No.: 479,962

[22] Filed: Jun. 7, 1995

Related U.S. Application Data

[62] Division of Ser. No. 114,870, Aug. 31, 1993, Pat. No. 5,463,500.

[51] Int. Cl.[6] ............................ G02B 13/00; G02B 23/00
[52] U.S. Cl. .................... 359/362; 359/399; 359/744; 359/900
[58] Field of Search ...................... 359/900, 362, 359/367, 399, 404–407, 411, 480–481; 351/41, 158, 51, 204, 205; 623/6

[56] References Cited

U.S. PATENT DOCUMENTS

| | | | |
|---|---|---|---|
| 1,197,742 | 9/1916 | Kellner | 359/744 |
| 1,395,822 | 11/1921 | Hastings | 359/399 |
| 1,507,111 | 9/1924 | Erfle | 359/744 |
| 1,851,579 | 3/1932 | Hixon | 359/411 |
| 3,273,456 | 9/1966 | Feinbloom | 359/481 |
| 3,438,689 | 4/1969 | Wehr | 359/422 |
| 3,936,152 | 2/1976 | Aurin et al. | 359/733 |
| 4,070,098 | 1/1978 | Buchroeder | 359/725 |
| 4,278,330 | 7/1981 | Buchroeder | 359/676 |
| 4,364,645 | 12/1982 | Feinbloom | 351/204 |
| 4,498,743 | 2/1985 | Feinbloom | 351/45 |
| 4,555,164 | 11/1985 | Feinbloom | 359/670 |
| 4,557,567 | 12/1985 | Azumi et al. | 359/683 |
| 4,621,283 | 11/1986 | Feinbloom | 348/77 |
| 4,863,468 | 9/1989 | Feinbloom et al. | 623/6 |
| 5,090,796 | 2/1992 | Feinbloom | 351/158 |
| 5,129,717 | 7/1992 | Feinbloom | 351/158 |
| 5,196,028 | 3/1993 | Portney et al. | 623/6 |
| 5,291,229 | 3/1994 | Feinbloom | 351/57 |
| 5,381,263 | 1/1995 | Nowak et al. | 351/158 |
| 5,463,500 | 10/1995 | Buchroeder | 359/362 |

Primary Examiner—Thong Nguyen
Attorney, Agent, or Firm—Fitch, Even, Tabin & Flannery

[57] ABSTRACT

The light-weight clinical viewer includes a two-element objective lens and a single-element eyepiece lens. Use of multiple lenses allows for a more compact package. The doublet objective serves to reduce vignetting while providing a wide field of view and reduced chromatic aberration. Image quality is further enhanced, while keeping the weight of the viewer down, through the use in the objective of light-weight high index glass. Moreover, the invention permits the use of a single mounting barrel assembly for different eyepieces to reduce manufacturing costs.

2 Claims, 1 Drawing Sheet

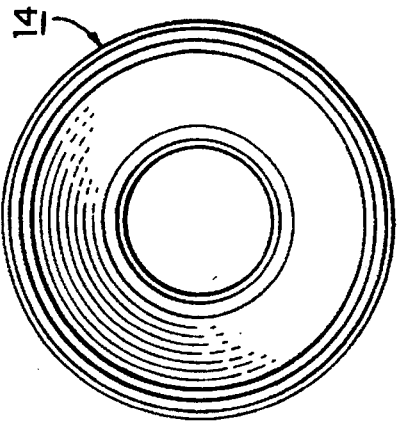
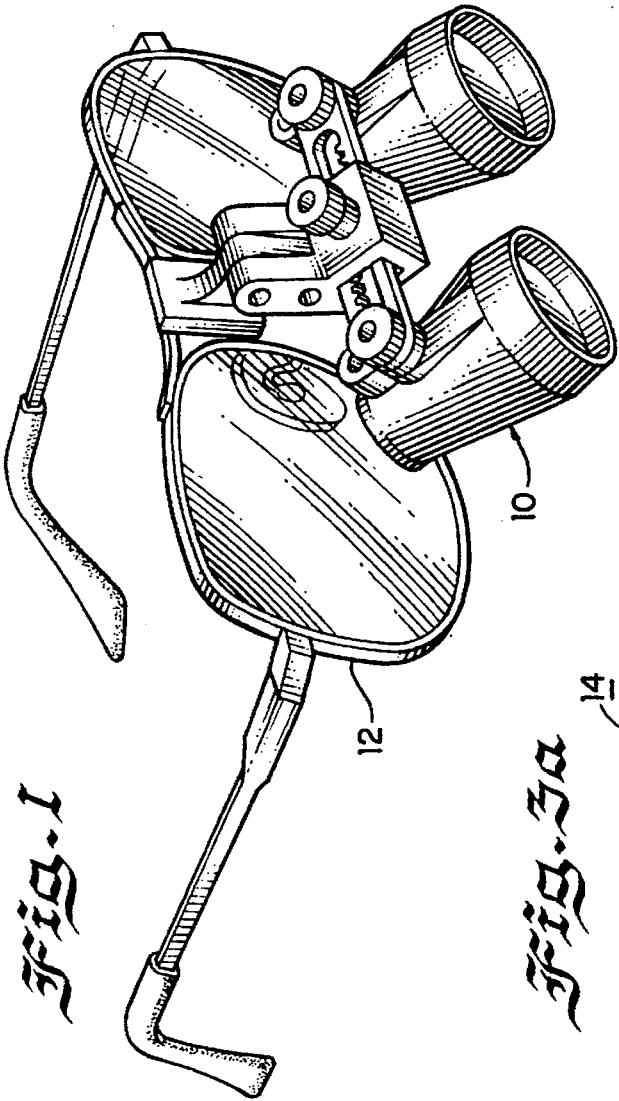
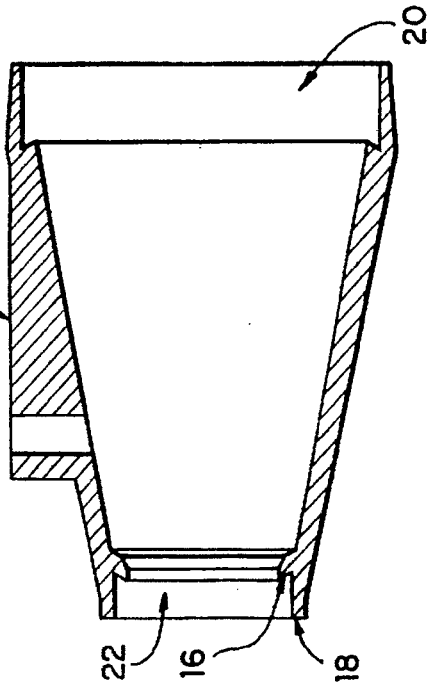
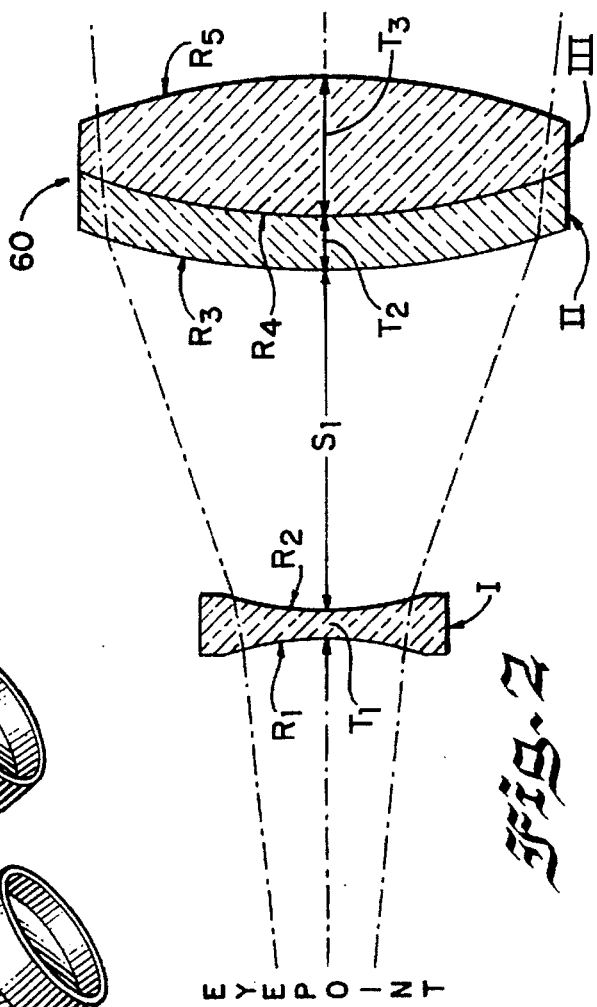

LIGHT-WEIGHT THREE-ELEMENT CLINICAL VIEWER

This application is a Divisional of application Ser. No. 08/114,870, filed on Aug. 31, 1993, now U.S. Pat. No. 5,463,500.

CROSS REFERENCE TO RELATED APPLICATION

This invention is related to an application entitled "LIGHT-WEIGHT HIGH-MAGNIFICATION CLINICAL VIEWER" Ser. No. 08/115,166, filed on Aug. 31, 1993, now U.S. Pat. No. 5,515,209, and assigned to the same assignee as the assignee of the present invention.

BACKGROUND OF THE INVENTION

1. Field of the Invention

The present invention relates to magnification viewers worn by surgeons and dentists. In particular, it relates to a compact, light-weight, comfortable-to-wear, high magnification viewer having an extremely wide field of view and good image quality.

2. Description of the Prior Art

Magnification viewers are worn by dentists and surgeons for extended periods of time during clinical procedures so as to provide clarity of view while avoiding a "hunched-over" position that can result in debilitating neck and back strain, which can have an adverse effect on the success of the operation. By permitting the clinician to operate at a greater working distance from the patient, higher magnification viewers also reduce the clinician's exposure to aerosols.

Because clinicians use magnification viewers during surgery and other procedures requiring manual precision, it is important that they be light-weight, comfortable, and have good clarity and wide field of vision while providing high magnification.

Clinical magnification viewers are generally made according to the "Galilean telescope" design, having a single objective lens and a single eyepiece lens. Galilean telescopes are characterized by relatively narrow fields of view which are mainly limited by the diameter of the objective lens. The basic Galilean design, however, produces substantial chromatic aberration ("coloring") and, hence, poor image quality.

The magnification, or power, of a Galilean telescope is proportional to the focal length of the objective and inversely proportional to the focal length of the eyepiece. Overall viewer length is proportional to the sum of the focal lengths of the objective and eyepiece.

Since the viewer should be kept as short as possible to reduce torque on the nose and wearer discomfort, an eyepiece with a shorter focal length is usually employed when an increase in magnification is desired. However, to retain a good field of view without vignetting, the diameter of the objective must be increased. If this is done while keeping the focal length of the objective the same, the "speed" of the lens increases, which results in a lower resolution quality. It also mandates an excessively large package. One method of overcoming the "speed" problem is to use a more complicated objective lens, through at the cost of greatly increased weight and strain and discomfort to the wearer.

The so-called Kellner design (from Kellner, U.S. Pat. No. 1,197,742 "Lens System") in general use today contains a heavy doublet objective and a singlet eyepiece lens. While image quality is adequate at lower magnifications, at higher magnifications, excessive coloring results in poor image quality. Moreover, the field of view is relatively limited.

It is known that image quality in prior art magnification viewers can be enhanced by the use of "very high index flint glass". However, this method has not been in general use, since "very high index flint glass" makes the viewer too heavy for practical use.

Finally, prior art magnification viewers require lens mounting barrels of differing sizes in order to provide a wide range of focusing or working distances. As such, the manufacturing costs for prior art viewers are relatively high.

SUMMARY OF THE INVENTION

Accordingly, it is an object of the present invention to provide a compact, light-weight, high-resolution, high-magnification viewer with a wide field of view that is comfortable to wear over extended periods of time.

A further object of the present invention is to provide a magnification viewer having better color quality than prior art magnification viewers.

A further object of the invention is to provide a magnification viewer having a wider field of view even at high magnification levels than the prior art magnification viewers.

A further object of the present invention is to provide a higher resolution magnification viewer while maintaining small diameter lenses than prior art magnification viewers.

A further object of the present invention is to provide a more compact magnification viewer than prior art viewers.

A further object is to provide a lighter-weight magnification viewer having superior image quality than previous magnification viewers.

A further object of the present invention is to provide a magnification viewer having relatively light lens elements while improving image quality using high index glass.

A further object of the invention is to provide method for making a magnification viewer in which all lenses for an entire series of working distances require just a single mounting barrel assembly.

In accordance with one embodiment of the invention, the magnification viewer includes a two-element objective lens and a single-element eyepiece lens. Use of multiple lenses allows for a more compact package. The doublet objective serves to reduce vignetting while providing a wide field of view and reduced chromatic aberration. Image quality is further enhanced, while keeping the weight of the viewer down, through the use in the objective of light-weight high index glass. Moreover, the invention permits the use of a mounting barrel of a common size for a series of working distances.

DESCRIPTION OF THE DRAWINGS

FIG. 1 is a perspective drawing of the viewer as attached to a pair of glasses;

FIG. 2 is a diagram illustrating the viewer having a two-element objective and a single-element eye-piece;

FIG. 3a is a sectional view of the mounting barrel of the magnification viewer; and FIG. 3b is an end view of the mounting barrel illustrated in FIG. 3a.

DETAILED DESCRIPTION OF THE INVENTION

One embodiment of the present invention, FIG. 1, includes a pair of magnification viewers 10, attached to a pair of eyeglasses, 12.

Optics for the magnification viewer 10 are shown in FIG. 2. The viewer according to the invention includes a single-element eyepiece lens including element I and a two-element objective lens including elements II–III. R1, R2, etc. represent the radii of respective refractive surfaces; $S_1$ represent the thickness of the air space; and $T_1$, $T_2$ etc. represent the thicknesses of the lens elements.

The magnification viewer could be made of a single eyepiece and a single objective lens. However, chromatic aberrations would result in poor image quality. In the alternative, the objective lens could be made a doublet, as in the Kellner system. However, the Kellner system provides relatively poor image quality.

Image quality can be improved through the use of very high index flint glass in element II of the objective lens. However, this has not been done in the past since the use of very high index flint glass, coupled with a greater number of lens elements, of course, greatly increases the weight of the viewer which, again, is undesirable (e.g., standard very high index flint glass, such as Schott Optical Glass Company type SF6 has a specific gravity of 5.18 grams per cubic centimeter).

Consequently, the invention uses "light-weight high index glass" of the type available from various manufacturers such as Schott and Ohara (e.g., Schott type SFL6, which has a specific gravity of only 3.37 grams per cubic centimeter). The resulting doublet is reduced in weight while providing reduced aberrations and higher image quality.

The invention provides advantages in the manufacturing process, as well. Prior art magnification viewers have been designed such as to require mounting barrels of differing sizes in order to achieve a range of working distances, which result from variations in the radii of curvature of the various lenses.

A sectional view of the mounting barrel 14 is shown in FIG. 3a; an end view is shown in FIG. 3b. It is known that the radii of curvature for the various lens elements used in the doublet objective are kept the same for viewers of differing working distances. Thus, to change the viewer's working distance, the radii of curvature of the eyepiece, lens element I (See also FIG. 2), must be altered. However, in order to reduce manufacturing costs, a method in accordance with one aspect of the present invention is disclosed in which only the exterior radius of curvature $R_1$ of lens element I is changed. The interior radius of curvature $R_2$ of lens element I is kept constant. This allows for the use across various working distances of only one mounting barrel 14, having an inner rim 16 (FIG. 3) sized to accept an eyepiece having that single interior radius of curvature $R_2$. Thus, by designing several eyepiece lenses that have the same radius of curvature $R_2$ facing the same doublet objective, and changing only radius of curvature $R_1$, all lenses for an entire series of working distance require just a single mounting barrel assembly. This allows for a reduction in both manufacturing cost and complexity.

The objective lens 60 is mounted at one end 20 of the mounting barrel 14. The eyepiece lens I is mounted at the opposite end 22. Both are sealed in place in a conventional manner. The eyepiece lens I is fixed in place such that its face having the constant radius of curvature $R_2$ fits within the mounting barrel facing the doublet objective.

Exemplary construction data for a viewer built according to the preferred embodiment shown in FIG. 2 are given in TABLE 1, TABLE 2, and TABLE 3. These represent, respectively, the "Viewer with Exemplary Standard Working Distance", "Viewer with Exemplary Long Working Distance", and "Viewer with Exemplary Extra Long Working Distance" configurations.

TABLE 1

Viewer with Exemplary Standard Working Distance

| Element | $n_d$ | $v_d$ | Radius | Thickness | Separation |
|---|---|---|---|---|---|
| I | 1.517 | 64.2 | $R_1 = 55.780$ | $T_1 = 1.0$ | $S_1 = 21.14$ |
|  |  |  | $R_2 = 25.110$ |  |  |
| II | 1.805 | 25.4 | $R_3 = 93.987$ | $T_2 = 1.5$ |  |
|  |  |  | $R_4 = 48.006$ |  |  |
| III | 1.517 | 64.2 | $R_4 = 48.006$ | $T_3 = 6.5$ |  |
|  |  |  | $R_5 = 30.240$ |  |  |

TABLE 2

Viewer with Exemplary Long Working Distance

| Element | $n_d$ | $v_d$ | Radius | Thickness | Separation |
|---|---|---|---|---|---|
| I | 1.517 | 64.2 | $R_1 = 49.030$ | $T_1 = 1.0$ | $S_1 = 21.14$ |
|  |  |  | $R_2 = 25.110$ |  |  |
| II | 1.805 | 25.4 | $R_3 = 93.987$ | $T_2 = 1.5$ |  |
|  |  |  | $R_4 = 48.006$ |  |  |
| III | 1.517 | 64.2 | $R_4 = 48.006$ | $T_3 = 6.5$ |  |
|  |  |  | $R_5 = 30.240$ |  |  |

TABLE 3

Viewer with Exemplary Extra Long Distances

| Element | $n_d$ | $v_d$ | Radius | Thickness | Separation |
|---|---|---|---|---|---|
| I | 1.517 | 64.2 | $R_1 = 44.860$ | $T_1 = 1.0$ | $S_1 = 21.14$ |
|  |  |  | $R_2 = 25.110$ |  |  |
| II | 1.805 | 25.4 | $R_3 = 93.987$ | $T_2 = 1.5$ |  |
|  |  |  | $R_4 = 48.006$ |  |  |
| III | 1.517 | 64.2 | $R_4 = 48.006$ | $T_3 = 6.5$ |  |
|  |  |  | $R_5 = 30.240$ |  |  |

The radius, thickness, and separation dimensions are given in millimeters. Roman numerals identify the lens elements in their respective order from the eyepoint side to the object side; $n_d$ represents the refractive index of each. element; $v_d$ is the Abbe dispersion number; $R_1$, $R_2$, etc., represent the radii of the respective refractive surfaces, in order, from the eyepoint side to the object side; $T_1$ and $S_1$ etc., represent the thicknesses of the lens elements and air spaces, respectively, from the eyepoint side to the object side, $T_1$ being the thickness of the first element I and $S_1$ being the thickness of the airspace between I and II. The thicknesses $T_1$ and $S_1$ etc. are measured along the optical centerline.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the U.S. is:

1. A method for making viewers for different working distances, comprising the steps of:

(a) providing eyepieces, each eyepiece defining a first curved surface and a second curved surface, said first curved surfaces of all of said eyepieces having the same radii of curvature and the second curved surfaces having various radii of curvature;

(b) providing a lens barrel adapted to receive an objective lens and one of said eyepieces;

(c) assembling one of said eyepieces to one end of said lens barrel such that said second curved surface faces outwardly;

(d) providing objective lenses, each objective lens defining a first curved surface and a second curved surface, the radii of curvatures for said first curved surfaces of each of said objective lenses being the same, and the radii of curvatures for said second curved surface for each of said objective lenses being the same; and (e) assembling an objective lens to an opposing end of said lens barrel such that it faces said first curved surface of one of said eyepieces to form a viewer with a predetermined working distance, said working distance being changed by changing the radii of curvature for said second curved surface of said one eyepiece with the same radii of curvature of said first and second surfaces of said objective lens.

2. The method for making viewers as recited in claim 1, wherein said objective lenses are doublet lenses.

* * * * *